W. E. HENRY.
Railroad-Rail Joint.

No. 92,310.  Patented July 6, 1869.

United States Patent Office.

WILLIAM E. HENRY, OF JOLIÉT, ILLINOIS.

Letters Patent No. 92,310, dated July 6, 1869.

IMPROVED RAILWAY-RAIL SPLICE.

The Schedule referred to in these Letters Patent and making part of the same.

Be it known that I, WILLIAM E. HENRY, of the city of Joliet, in Will county, and State of Illinois, have invented a new Method of Connecting or Joining the Ends of Railroad-Rails together; and that the following is a full, clear, and exact description of the same, reference being had to the annexed drawings, making a part of this specification, in which—

Figure 1:
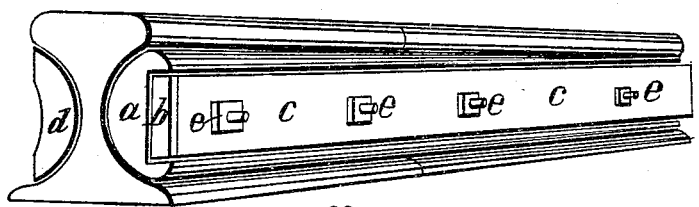
Figure 2:
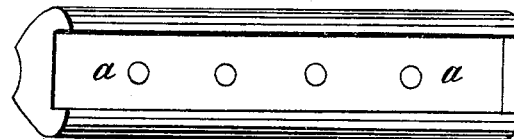
Figure 3:
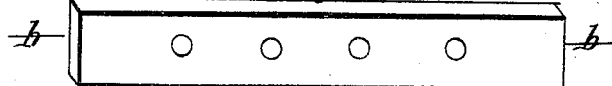
Figure 4:
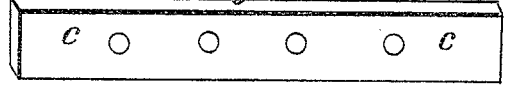

Figure 1 is a perspective view of the two rails joined together by the device;

Figure 2, a perspective view of the grooved plate $a$;

Figure 3, a perspective view of the strip between the grooved plate $a$ and the continuous washer $c$; and Figure 4, a perspective view of the continuous washer $c$.

It is well known that the old method of connecting or joining railroad-rails at the ends, by means of a plate on either side of the rails, over the joint, with bolts passing through, has been quite inefficient in this, that the continual jar and rattle of the trains passing along over the rails, cause the nuts on the bolts to work loose, so that in a little while the bolts fall out, letting the plates fall down, and the rails left entirely disconnected and apart.

My invention consists in a device or method of preventing the nuts from getting loose on the bolts, and of course preventing the plates from getting loose at all.

I have found that by placing a strip of some elastic or partially elastic substance between the plate $a$ and the continuous washer $c$, it will effectually prevent the nuts from working loose on the bolts, because the shock to the rail by a passing train is not imparted to the nut in so great a degree as when the elastic strip is not used, because then all is rigid and unyielding, and if the nut gets loose at all it will almost invariably get entirely off; while when the elastic strip is used, if the nut happens to work a little loose, the elasticity of the strip holds the washer out against the nut for some distance before they are entirely separated; and so long as they are in contact, the washer, in a very great degree, prevents the nut from turning.

In order to use the elastic strip $b$, and keep it in place, I use the grooved plate $a$ to receive the strip.

This grooved plate may be used on both sides of the rails, if necessary, but usually the ordinary plate $d$ on one side is sufficient.

The elastic strip may be of any elastic substance, but ordinarily either wood or rubber is sufficient.

In place of the ordinary washer, I use a continuous washer, as long as the plates $a$ and $d$, for the reason that if one nut or bolt should happen to get loose, the washer on that bolt will not, in jingling about, assist in getting the nut entirely off, for it is held firm by the other bolts. It also serves to hold in place the elastic strip $b$.

The plates $a$ and $d$ and washer $c$ are held together firm to the sides of the rails, as shown in the drawings, by the bolts $e$, with nuts on the ends.

Claim.

Having thus described my invention,

What I claim as new, and desire to secure by Letters Patent, is—

The railway-rail splice, consisting of the bar $d$, grooved bar $a$, elastic strip $b$, continuous washer $c$, and connecting-bolts, all constructed and arranged to operate substantially as and for the purposes set forth.

WILLIAM E. HENRY.

Witnesses:
THOS. H. HUTCHINS,
W. J. HUTCHINS.